United States Patent [19]

Cavestany et al.

[11] 3,726,267

[45] Apr. 10, 1973

[54] FLUE GAS VENTING ARRANGEMENT

[75] Inventors: Adrian V. Cavestany, Pasadena, Isaac Berger, Hacienda Heights, both of Calif.

[73] Assignee: Carrier Corporation, Syracuse, N.Y.

[22] Filed: Dec. 6, 1971

[21] Appl. No.: 205,228

[52] U.S. Cl. .................126/85 B, 126/307 R, 98/36
[51] Int. Cl. ..............................................E04f 17/02
[58] Field of Search................98/48, 36; 126/85 B, 126/307 R

[56] References Cited

UNITED STATES PATENTS

| | | | |
|---|---|---|---|
| 2,755,794 | 7/1956 | Wendell | 126/85 B |
| 3,446,202 | 5/1969 | Cooper et al. | 126/85 B |
| 3,659,560 | 5/1972 | Garter | 126/85 B |
| 3,623,458 | 11/1971 | Block | 126/307 R |
| 3,473,905 | 10/1969 | Jago et al. | 98/36 |
| 2,974,650 | 3/1961 | McCorquodale | 126/307 R |

*Primary Examiner*—William E. Wayner
*Assistant Examiner*—William E. Tapolcal
*Attorney*—Harry G. Martin, Jr. et al.

[57] ABSTRACT

A gas furnace having a combustion air compartment sealed from an air heating compartment therein, is provided with an air inlet opening communicating with the combustion air compartment and a flue gas outlet tube projecting outwardly from the front side of the furnace housing. A relief air opening communicating with the combustion air compartment is provided in the side of the housing adjacent to the flue gas outlet tube. A flue gas cap is disposed on the side of the housing over the flue gas outlet tube and the relief air opening. The flue gas cap has an internal baffle parallel with the side of the housing and spaced therefrom to form a buffer air passage. The flue gas outlet tube extends through the parallel baffle so that flue gas is discharged on the side of the parallel baffle away from the housing and escapes through the ends of the flue gas cap. Air from the combustion air compartment passes outwardly from the housing through the relief air openings into the buffer passage and escapes from the sides of the flue gas cap to form a rising curtain of air which inhibits the flue gas from directly contacting the side of the furnace housing, thereby reducing scorching of the paint.

4 Claims, 6 Drawing Figures

FLUE GAS VENTING ARRANGEMENT

BACKGROUND OF THE INVENTION

This invention relates to fuel burning apparatus, and more particularly, to apparatus such as furnaces of the type having a flue gas vent adjacent one side thereof.

In many instances, it is desirable to provide a fuel burning furnace with a flue gas outlet directly adjacent a side of the furnace housing. Often the side of the furnace housing from which the flue gas escapes is discolored due to sooting or paint scorching by the hot flue gases rising upwardly from the flue gas vent. Furthermore, if the furnace is located directly adjacent the wall of a building, as is frequently the case, the building wall may also be discolored due to sooting or scorching by the flue gas.

It is a principal object of this invention to provide a fuel burning apparatus having a flue gas outlet arrangement which provides a curtain of cooler air along the side of the furnace to reduce discoloration of the adjacent wall of the apparatus by exhausted flue gases.

SUMMARY OF THE INVENTION

A fuel burning apparatus, such as a furnace, for heating a fluid medium, such as air, is provided with a housing which is partitioned into a combustion air compartment and a fluid heating compartment. The combustion air compartment has a fuel burner disposed therein for heating the combustion side of a suitable heat exchanger. Flue gases are exhausted from the combustion side of the heat exchanger through a flue gas outlet tube extending outwardly from a wall of the housing and an air relief opening is formed in that wall adjacent the flue gas outlet tube. An air inlet opening is formed in a wall of the housing and communicates with the combustion air compartment for supplying air thereto. A flue gas cap is disposed over the flue gas outlet tube and the relief air opening on the exterior wall of the housing. The flue gas cap includes a parallel baffle spaced from the exterior wall of the housing through which the flue gas outlet tube extends so that the flue gas is discharged on the side of the parallel baffle away from the housing. This arrangement provides a curtain of air passing outwardly from the relief air opening through the air passage between the parallel baffle and the wall of the furnace housing to inhibit direct contact of the flue gas with the side of the housing and thereby reduce scorching and overheating of the exterior wall of the furnace.

DESCRIPTION OF THE PREFERRED EMBODIMENT

Figure 2:
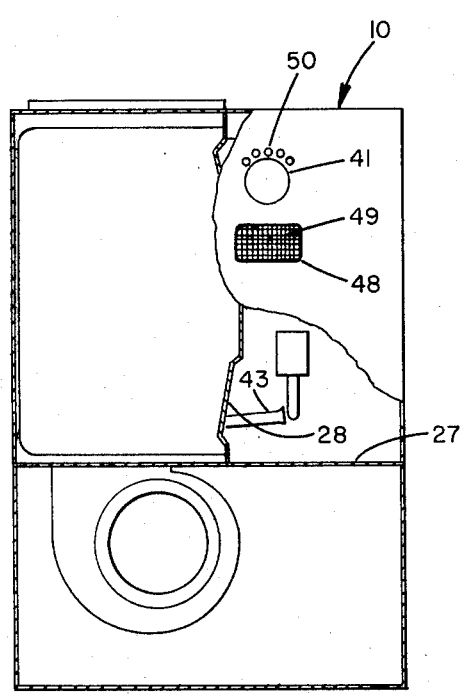
FIG. 2 is a broken view illustrating the side of the furnace with the flue gas cap and air inlet cap removed.
Figure 1:
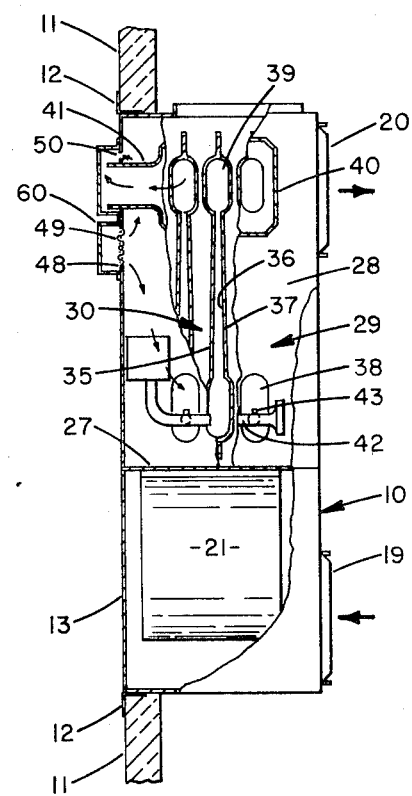
FIG. 1 illustrates a cross sectional view partially broken away of a furnace having a flue gas venting arrangement in accordance with this invention.

Referring to FIG. 1, a furnace 10 is illustrated as being mounted on the side of a building 11 by suitable mounting flanges 12 through which screws or other fasteners extend to secure the furnace in position. In the illustrated embodiment, the furnace is shown as having a housing including a front vertical wall 13 mounted flush with the side of building 11, but the furnace may be mounted so that it projects through the opening in the wall if desired. A conditioned air inlet opening 19 and outlet opening 20 are formed in the rear wall of the furnace. Air to be conditioned is drawn into inlet 19 by fan 21 where it is heated and the heated air is discharged from the furnace housing through outlet opening 20. While an air heating furnace is described, the furnace may be an apparatus of a type used to heat other fluids, such as a water heater or boiler.

The interior of the furnace housing is partitioned by partitions 27 and 28 so as to form a combustion air compartment 29 and an air heating compartment 30. A plurality of heat exchanger cells 35 having a combustion side 36 and an air heating side 37 are disposed within the interior of the furnace housing. The combustion side of heat exchangers 35 have an inlet end opening 38 to receive combustion air and fuel gas and have an outlet end 39 at the top of the heat exchanger cells for discharging flue gas into a flue gas header 40. Flue gas header 40 terminates in a horizontally extending flue gas outlet tube 41 which extends through front wall 13 of the furnace housing and projects a substantial distance therefrom. Fuel is supplied to gas burner 43 in inlet end 38 of each of the heat exchanger cells 35 from a fuel gas header 42 connected to a source of gas.

Front wall 13 of the furnace housing is provided with an air inlet opening 48 having a filter screen 49 thereover for the purpose of admitting combustion air into the combustion compartment or combustion side of furnace 10. Air inlet 48 can also admit air into the interior of the furnace to create a draft of relatively cool air between the furnace housing and the flue gas discharged therefrom, as will be subsequently explained. Front wall 13 has formed therein a plurality of relief air openings 50 communicating with the combustion air compartment. Relief air openings 50 are preferably located closely adjacent flue gas outlet tube 41 and may be arrayed in a semicircular arrangement over the upper segment of the flue gas outlet tube.

Figure 3:
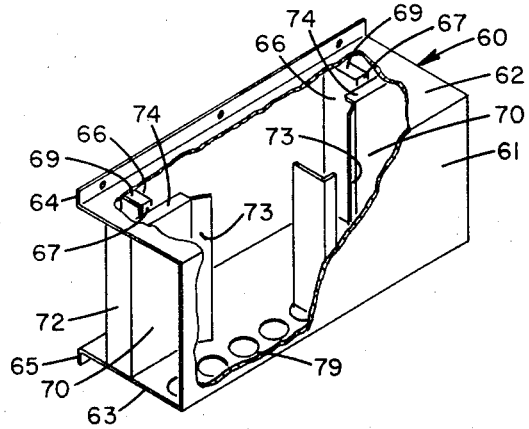
FIG. 3 is a perspective view, partially broken away, of the air inlet cap.
Figure 4:
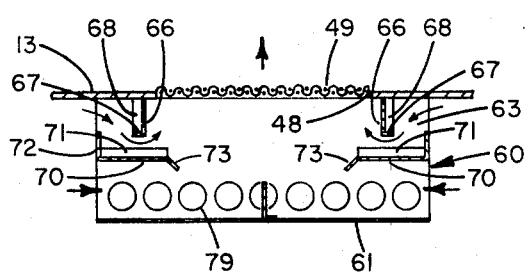
FIG. 4 is a cross sectional view through the air inlet cap.

An air inlet cap 60 shown in FIGS. 3 and 4 is disposed over air inlet opening 48. The air inlet cap is channel shaped having a front wall 61, a top wall 62, a bottom wall 63 and flanges 64 and 65 for securing the inlet cap to front wall 13 of the furnace housing. The ends of air inlet cap 60 are open to admit ambient air into the baffled interior of the inlet cap. A pair of first perpendicular baffles 66 having a small parallel flange 67 and mounting flanges 68, 69, extend between and are secured to bottom wall 63 and top wall 62 of the inlet cap in such a location that they will lie one on each side of inlet opening 48. A pair of second and generally parallel baffles 70 having mounting flanges 71, 74 and a small perpendicular flange 72 extend between and are secured to bottom wall 63 and top wall 62 of air inlet cap 60. One of the baffles 70 lie on each side of the center of the inlet cap and have a forwardly converging angular flange section 73. A plurality of air apertures 79 are formed across the forward portion of bottom wall 63 of the air inlet cap and lie adjacent front wall 61 thereof.

Figure 5:
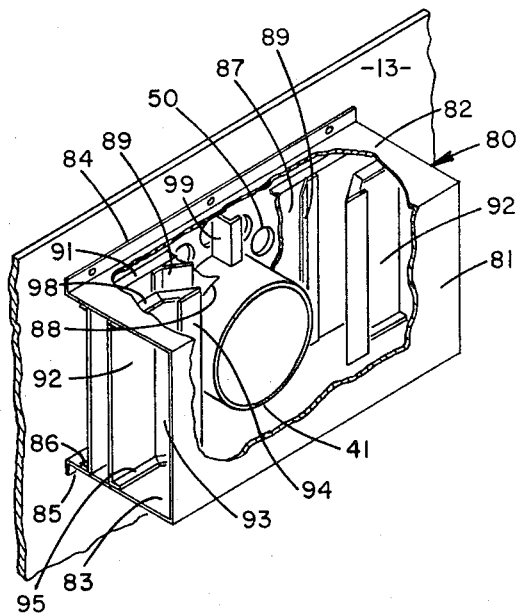
FIG. 5 is a perspective view, partially broken away, of the flue gas cap.
Figure 6:
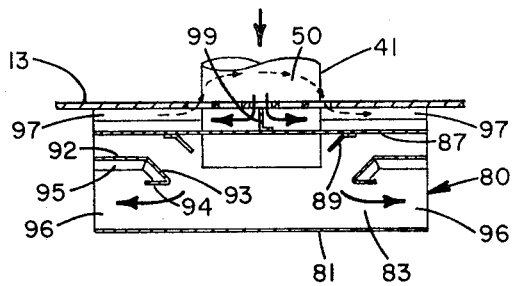
FIG. 6 is a cross sectional view through the flue gas cap.

A flue gas cap 80, shown in FIGS. 5 and 6, is disposed over the projecting end of flue gas outlet tube 41 and relief air openings 50. Flue gas cap 80 is channel shaped and has a front wall 81, a top wall 82 and a bottom wall 83 with mounting flanges 84 and 85 for securing it to front wall 13 of the furnace housing. Flue gas cap 80 has open ends and is internally baffled to provide desirable air flow characteristics within it under various wind conditions. A first parallel baffle 87 is secured to top wall 82 and bottom wall 83 by mounting flanges 86, 91 in parallel spaced relation with front wall 13 of the furnace housing. Parallel baffle 87 extends from top wall 82 to bottom wall 83 of flue gas cap 80 and has an aperture 88 formed therein closely surrounding the projecting outlet end of flue gas outlet tube 41. Preferably parallel baffle 87 has a pair of angular flanges 89 secured on the front side thereof extending forwardly therefrom at about a 45° angle toward the axis of flue gas outlet tube 41. A pair of second parallel baffles 92 are secured by mounting flanges 95, 98 to bottom and top walls 83, 82 of the flue gas cap at a location between parallel baffle 87 and front wall 81 thereof. Second baffles 92 are provided with an angular flange 93 and a small parallel flange 94. Angular flanges 93 are tapered at about the same angle as angular flanges 89 forwardly toward the axis of flue gas outlet tube 41. A third, perpendicular, baffle 99 extends from the upper surface of flue gas outlet tube 41 to top wall 82 of the flue gas cap.

Air inlet cap 60 and flue gas cap 80 in combination with each other provide a balanced venting arrangement for furnace 10 under various conditions of wind direction and velocity. Under conditions of relatively little wind, combustion air is drawn into the open sides and the apertures 79 of air inlet cap 60 and passes through filter 49 to the combustion air compartment of furnace 10. A portion of this air passes downwardly to the inlet end 38 of heat exchangers 35 where it mixes with fuel gas discharged from fuel burners 43 and is burned. The hot gaseous exhaust of fuel burner 43 passes upwardly through the interior of heat exchanger cells 35 to outlet end 39 where it is collected in flue gas header 40. The hot flue gases then pass from the furnace through flue gas outlet tube 41 and are discharged on the front side of parallel baffle 87 away from front wall 13 of the furnace. In the absence of wind, the hot flue gases are directed toward both ends of the horizontally extending flue gas passage 96 and escape from both sides of flue gas cap 80 as shown by full line arrows in FIG. 6.

In accordance with this invention, another portion of the cool combustion air admitted into combustion air inlet 48 passes upwardly along the interior rear wall 13 of the furnace where it is warmed by radiation from the heat exchanger and passage over flue gas outlet tube 41. The warmed air passes by connection upwardly and out of the housing of the furnace through relief air openings 50 into buffer air passage 97 formed between parallel baffle 87 and front wall 13 of the furnace. Under no wind conditions, some of the relief air will pass out of relief air openings 50 on both sides of perpendicular baffle 99, as shown by full line arrows, and will be discharged from both open ends of flue gas cap 80. The air discharged from the open ends of the flue gas cap adjacent wall 13 of the furnace forms a rising air curtain of relatively cooler buffer air which tends to prevent the hot flue gases from directly contacting the front wall of the furnace or of the building to which the furnace is secured. Consequently, the buffer air curtain provided by this invention prevents the wall of the furnace from reaching an excessive temperature and reduces the tendency of discoloration due to paint scorching.

The air inlet cap and flue gas cap are baffled to also provide the desired buffer air under various wind conditions, although the functioning is somewhat different. For example, if the wind is passing from left to right as shown in FIG. 6 by the broken line arrows, a portion of the wind will blow into the buffer air passage on the left-hand side of the illustration and will enter air relief openings 50 on the left-hand side of baffle 99. Baffle 99 prevents the wind from blowing directly through the buffer air passage. The air entering air relief openings 50 on the left-hand side will pass over the top of flue gas outlet tube 41 and will exit from the combustion air side of the furnace through the relief air passages 50 on the right-hand side of baffle 99. The wind will then escape from the buffer air passage only on the right-hand side of the drawing. At the same time, wind entering flue gas passage 96 and between baffles 92 and 87 on the left-hand side of the drawing will induce the flue gases to flow outwardly through the flue gas passage 96 on the right-hand side so the flue gas will exhaust from the flue gas cap only from the right-hand side. Consequently, a buffer air curtain is still maintained between the flue gas and wall 13 of the furnace opposite whichever side of the housing from which the wind is blowing.

Air inlet cap 60 is suitably baffled by baffles 66 and 70 in combination with air aperture 79 and open sides of the inlet cap so that sufficient air is admitted under various wind conditions to provide the needed combustion air, but so that wind will not blow excessive air into inlet opening 48 and extinguish the pilot or gas flame.

A furnace venting arrangement in accordance with this invention provides a curtain of relatively cool air between the flue gas and the wall of the furnace or building to which it is secured to protect the wall from scorching under various conditions of wind direction or velocity. At the same time the venting arrangement provides a balanced vent capable of operating under the various wind conditions to provide an adequate supply of combustion air to the fuel burners without creating an excessive draft which might extinguish the pilot or fuel burners. A furnace in accordance with this invention can be mounted in a manner such that its front wall is substantially flush with the outside wall of the building being conditioned without unsightly discoloration of the furnace or building wall due to direct impingement of flue gas against the wall or scorching of the paint thereon.

While a preferred embodiment of this invention has been described for purposes of illustration, it will be ap-

We claim:

1. A fuel burning apparatus for heating a fluid medium to be conditioned comprising:
   A. a housing having walls enclosing a fuel burner and a heat exchanger for passing the fluid medium to be heated in heat exchange relation with the hot gaseous exhaust of the fuel burner, said heat exchanger having a fluid heating side and having a combustion side including an inlet end for receiving heated gases from the fuel burner and an outlet end for discharging the hot flue gas therefrom, partition means within the housing forming a combustion compartment and a fluid heating compartment, a flue gas outlet tube communicating with the outlet end of the combustion side of the heat exchanger for receiving the hot flue gases discharged from the combustion side of the heat exchanger, said flue gas outlet tube extending outwardly from one wall of the housing, a relief air opening formed in said one wall of said housing adjacent the flue gas outlet tube, said relief air opening communicating with the combustion air compartment in the interior of the housing;
   B. a flue gas cap disposed on said one wall of the housing over the projecting end of said flue gas outlet tube and said relief air opening, said flue gas cap having a parallel baffle disposed parallel to and in spaced relation with said one wall of said housing, said flue gas outlet tube extending through said parallel baffle so that flue gas is discharged on the side of said parallel baffle away from the housing, said parallel baffle forming with said one wall of said housing a buffer air passage for air to pass from said combustion air compartment through said relief air openings and up said one side of the housing and create an air curtain inhibiting the hot combustion gases discharged from the flue gas outlet tube from directly contacting said one wall of the housing.

2. A fuel burning apparatus as defined in claim 1 including a vertical baffle disposed between said parallel baffle and said one wall of the housing, said vertical baffle extending upwardly from the flue gas outlet tube to a top wall of the flue gas cap and dividing the buffer air passage into two adjacent portions each having a relief air opening communicating with the combustion air compartment, so that wind from a direction parallel to said one wall of the furnace may pass horizontally into one section of the buffer air passage, through the relief air opening in the one section, into the combustion air compartment, from the combustion air compartment out through the relief opening in the other section of the buffer air passage, from which it flows along said one wall of the furnace to protect the portion of the wall toward which the flue gases are blown by the wind.

3. A fuel burning furnace for heating air to be conditioned comprising:
   A. a housing having walls enclosing a fuel burner and a heat exchanger for passing air to be heated in heat exchange relation with the hot gaseous exhaust of the fuel burner, said heat exchanger having an air heating side and having a combustion side including an inlet end for receiving heated gases from the fuel burner and an outlet end for discharging the hot flue gas therefrom, partition means within the housing forming a combustion compartment and an air heating compartment sealed from the combustion compartment, a flue gas outlet tube communicating with the outlet end of the combustion side of the heat exchanger for receiving the hot flue gases discharged from the combustion side of the heat exchanger, said flue gas outlet tube extending outwardly from a vertical wall of the housing, an air inlet opening communicating with the combustion compartment formed in said vertical wall of the housing for admitting ambient air into the combustion compartment to supply combustion air to the fuel burner, a relief air opening formed in said vertical wall of said housing adjacent the flue gas outlet tube, said relief air opening communicating with the combustion air compartment in the interior of the housing;
   B. an air inlet cap disposed on said one wall of the housing over said air inlet opening, said air inlet cap comprising baffle means for restricting excessive air flow into the air inlet opening in said housing under various wind conditions;
   C. a flue gas cap disposed on said one wall of the housing over the projecting end of said flue gas outlet tube and said relief air openings, said flue gas cap comprising a channel shaped member having a top wall, a bottom wall and an end wall disposed parallel with and spaced from said vertical wall of the housing, the sides of said flue gas cap being open, a parallel baffle disposed in a vertical plane parallel to and in spaced relation with said vertical wall of the housing, said flue gas outlet tube extending through an aperture formed in said parallel baffle so that the flue gas is discharged from the flue gas outlet tube on the side of the parallel baffle away from said vertical wall of the housing, the parallel baffle forming with the end wall of said flue gas cap a horizontally extending flue gas passage spaced from said vertical wall of the housing whereby flue gas from the flue gas tube passes into the flue gas passage and escapes from the open side of the flue gas cap, said parallel baffle forming with said vertical wall of the housing a horizontally extending buffer air passage between the vertical wall of the housing and the horizontal flue gas passage, said relief air opening communicating with the buffer air passage whereby air from the combustion air compartment passes through the relief air opening into said buffer air passage and escapes from the open sides of the flue gas cap adjacent the vertical wall of the housing to create a curtain of air between the flue gas discharged from the flue gas passage and said vertical wall of the housing.

4. A fuel burning furnace as defined in claim 3 including a vertical baffle disposed between said parallel baffle and said one wall of the housing, said vertical baffle extending upwardly from the upper surface of the flue gas outlet tube to the top wall of the flue gas cap and dividing the buffer air passage into two adjacent portions, each having a relief air opening into the combustion air compartment, so that wind from a direction parallel to said one wall of the furnace may pass horizontally into one section of the buffer air passage, through the relief air opening in the one section, into the combustion air compartment, from the combustion air compartment out through the relief opening in the other section of the buffer air passage, from which it flows upwardly along the one wall of the furnace to protect the portion of the wall toward which the flue gases are blown by the wind.

* * * * *